United States Patent
Martin

(10) Patent No.: US 7,284,708 B2
(45) Date of Patent: Oct. 23, 2007

(54) CARD WITH REWRITEABLE DISPLAY

(75) Inventor: Nathaniel G. Martin, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/209,479

(22) Filed: Aug. 23, 2005

(65) Prior Publication Data
US 2007/0045399 A1    Mar. 1, 2007

(51) Int. Cl.
*G06K 19/06* (2006.01)
(52) U.S. Cl. .................. 235/492; 235/493; 235/449; 235/451; 235/380; 349/86
(58) Field of Classification Search ........... 235/380, 235/492, 493, 449, 451; 349/86
See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 4,954,985 A | 9/1990 | Yamazaki | |
| 5,055,662 A | 10/1991 | Hasegawa | |
| 5,298,476 A | 3/1994 | Hotta et al. | |
| 5,321,239 A | 6/1994 | Masubuchi et al. | |
| 5,359,183 A | 10/1994 | Skodlar | |
| 5,534,685 A | 7/1996 | Takemoto et al. | |
| 5,604,027 A * | 2/1997 | Sheridon | 428/323 |
| 5,745,102 A | 4/1998 | Bloch et al. | |
| 5,914,805 A * | 6/1999 | Crowley | 359/296 |
| 6,019,284 A | 2/2000 | Freeman et al. | |
| 6,054,071 A * | 4/2000 | Mikkelsen, Jr. | 264/1.36 |
| 6,476,817 B1 | 11/2002 | Harper et al. | |
| 6,611,271 B2 | 8/2003 | Harper et al. | |
| 6,661,563 B2 * | 12/2003 | Hayashi et al. | 359/296 |
| 6,749,111 B2 | 6/2004 | Graef et al. | |
| 6,753,830 B2 * | 6/2004 | Gelbman | 345/55 |
| 6,767,147 B2 | 7/2004 | Jakubowski et al. | |
| 6,853,412 B2 * | 2/2005 | Stephenson | 349/86 |
| 2003/0011868 A1 * | 1/2003 | Zehner et al. | 359/296 |
| 2003/0105964 A1 * | 6/2003 | Brainard et al. | 713/178 |
| 2004/0254837 A1 * | 12/2004 | Roshkoff | 705/14 |
| 2005/0134461 A1 * | 6/2005 | Gelbman et al. | 340/572.8 |
| 2006/0081700 A1 * | 4/2006 | Li | 235/380 |

* cited by examiner

*Primary Examiner*—Michael G. Lee
*Assistant Examiner*—Kristy A. Haupt
(74) *Attorney, Agent, or Firm*—Pepper Hamilton LLP

(57) ABSTRACT

A transaction card is formed of an electrically-alterable display material. The display may be altered by the application of an external field, without requiring any circuiting on the card. The card also includes an information storage medium, and both the information storage medium and the display may be accessed by a card reader.

22 Claims, 3 Drawing Sheets

CARD WITH REWRITEABLE DISPLAY

BACKGROUND

Display technologies based on encapsulation of electrophoretic particles, multichromal beads and liquid crystals are known in fields such as electronic paper and other digital document media. Examples of electronic display devices using such materials include those available from Gyricon LLC of Ann Arbor, Mich. For example, as shown in FIG. 1, a group of encapsulated bichromal beads, cylinders, crystals or other bichromal or multichromal particles 10 are dispersed in an elastomeric sheet swollen by a fluid 12 and positioned atop a conductive substrate 14, which is typically a printed circuit board or other conductive material. The particles, fluid and substrate are covered with a transparent layer 16 such as glass or plastic and a transparent conductive material such as indium tin oxide (ITO) 18, and they are sealed to form a re-addressable display material in which the particles rotate in response to an electric or magnetic field that is applied to the conductive substrate. Such materials have been described in, for example, U.S. Pat. No. 4,126,854 to Sheridon and U.S. Pat. No. 4,143,103 to Sheridon, the disclosures of each of which are incorporated herein by reference in their entirety.

Bichromal displays have numerous advantages over conventional electrically addressable visual displays, such as LCD and CRT displays. In particular, they are suitable for viewing in ambient light, they retain an image indefinitely in the absence of an applied electric field, and they can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reusable substitute for ordinary paper. Bichromal displays have been used in several applications, such as in displays on compact disks and floppy disks as described in U.S. Pat. Nos. 6,611,271 and 6,476,817, respectively, each of which is incorporated herein by referenced in its entirety.

Transaction cards are common. Transaction cards are typically thin plastic or paper cards in a rectangular shape that have one or more magnetic strips. The cards are typically used for identification, access or for financial transactions. While display areas have been placed on transaction cards previously, prior transaction cards have been unable to achieve a lasting, changeable display that does not need a power source. In U.S. Pat. No. 6,019,284, the transaction card contains a display area that is powered by a power source. In U.S. Pat. No. 5,359,183, the use of the display on the card is electromagnetic and displays a value. However, it will only remain on the card for a limited period of time as the display may change as the card is moved or exposed to even a minor magnetic force.

Accordingly, a need exists for an improved transaction card with a rewriteable display area.

SUMMARY

In accordance with one embodiment, an electronically-alterable display forms at least a portion of a transaction card, such as a debit, credit, access or identification card. The display may be made of a bichromal material positioned between a substrate and a transparent overlayer. The display is alterable through the application of an external field without requiring any circuitry on the card. For example, the display may be altered based on a transaction card reader reading the information storage medium and applying an external field to change the display area. The display area may this change when the arrangement of the bichromal material is altered by selective application of the external field.

The bichromal material may be contained in capsules having a light color and a dark color. The capsules may change orientation in response to the external field, and the orientation of the capsules may determine an image or value on the display.

The card also includes an information storage medium, such as a radio frequency identification tag or a magnetic strip having a size and position on the card so that data on the strip can be read by a card reader. Optionally, the card may also include a card stock to which the display and the information storage medium are attached.

In an alternate embodiment, a method of changing a display member on a card includes receiving, by a card reader, a card. The card reader may read information from an information storage medium on the card, process the information to determine an item to be displayed, write the item to a human readable display on the card by configuring bichromal material to display the item. The display may be made of the bichromal material, and the bichromal material may responsive to a field applied by the card reader without the use of circuitry or a power source on the card.

Optionally, the card reader may also write the item to the information storage medium. Examples of items to be written may include an alphanumeric value, a new card number, an image, a monetary value, or other items. The card reader may communicate with an external device that performs at least a portion of the processing. Also optionally, the information storage medium may contain data that identifies a user or a user's account.

In an additional embodiment, a transaction card may include an information storage medium and a readdressable display. The display may include bichromal material that is responsive to a selectively applied field to produce an image on the display. Optionally, the display may also include a substrate and a conductive overlayer, and the bichromal material may be suspended in capsules between the substrate and the conductive overlayer. In this embodiment, no circuitry or power source is required on the card to create or maintain the display.

DETAILED DESCRIPTION

As used herein, the words "bichromal" and "multichromal" will be used interchangeably to refer to a display or a particle that may exhibit two or more colors. In addition, the words "bead", "particle" and "capsule" are used interchangeably to refer to a bichromal element for a display medium, such as a twisting cylinder, microcapsule, bead, electrophoretic material or any other bichromal or multichromal material that may be modulated by an applied electric or magnetic field. For example, a bichromal bead in an oil-filled capsule may rotate inside the capsule in response to the applied field.

The use of the word "between" is not limited to one item touching the other two items. In other words, if C is between A and F, it does not have to be ACF, instead it can be ABCDEF and still fit the description that B is between A and F.

The use of the word "transaction" and phrase "transaction card" is not limited to a financial transaction card, but instead includes any card that may be used for financial, identification or access purposes. Thus, a "transaction card" may include, for example, a credit card, debit card, transportation (such as bus or subway) card, a building access card, a hotel room access card, a membership card, or similar cards.

The description that follows generally relates to transaction cards having changeable display members, along with methods of changing the display on a transaction card. In various embodiments, the description relates to electronic paper-type transaction card displays.

Figure 1:
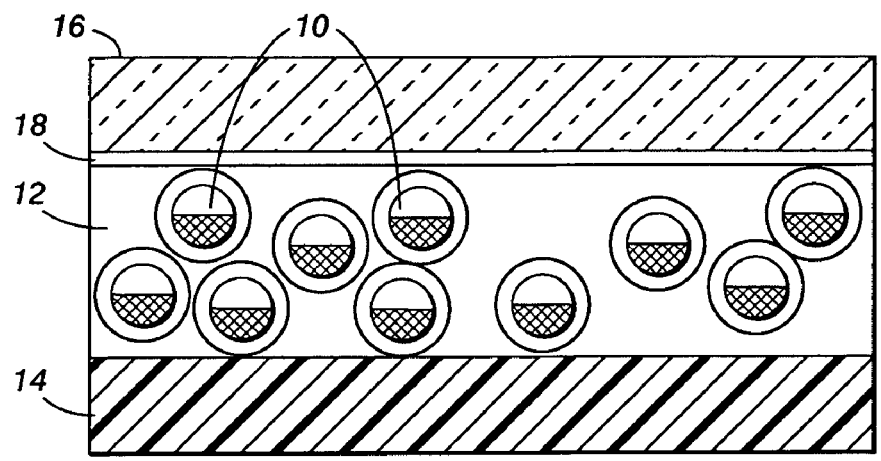
FIG. 1 illustrates exemplary elements of a prior art electronic display.
Figure 2A:
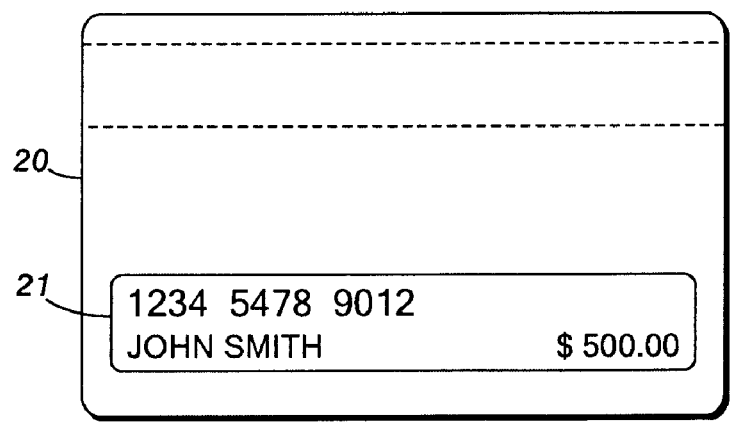
FIGS. 2A and 2B illustrate front and rear views, respectively, of an exemplary transaction card with a display area and an information storage medium.
Figure 2B:
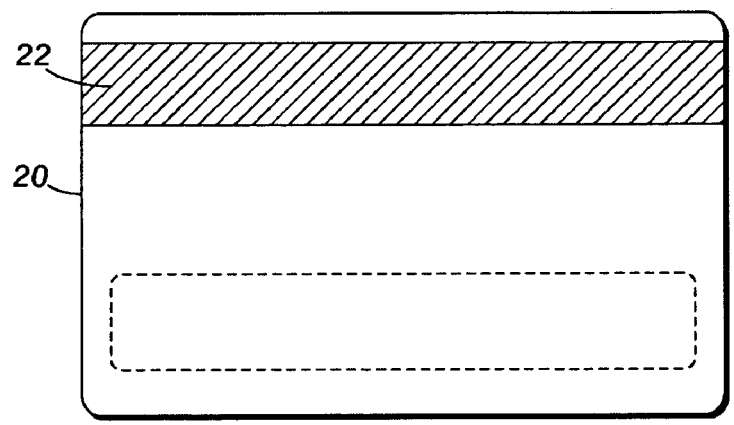

FIG. 2A illustrates a front view of an exemplary transaction card with a display area, and FIG. 2B illustrates a rear view of the exemplary card. The transaction card 20 optionally may be a purchase card such as a credit card, debit card, or gift card. Alternatively, the transaction card 20 may be another information-containing card such as an identification card or access card. The transaction card 20 may be a flat or a substantially flat card. The card 20 may be of any shape. Embodiments of the shape may include, but are not limited to, rectangular, hexagonal, half circle, or a parallelogram. In some embodiments, the card may be made of any suitable flexible-yet-sturdy material such as paper or plastic card stock. The card 20 includes a rewritable display area 21 and an information storage medium 22. Preferably, the display area may be of such a size to accommodate a reasonable number of alphanumeric characters or other images which may appear on the display. Optionally, the entire card, except for the information storage medium, may be made of the display area material.

Thus, the display area 21 can be affixed to the card, such as a display area that is placed on top of plastic or paper card stock. Alternatively, the display area can be integral in the card. For example, the display area 21 could be framed by supporting card stock, or it could make up the entire body of card 20. For example, in one embodiment, the display area could be the entire card length and attached to a card stock material. The magnetic strip, as the information storage medium, could then be affixed on top of or under the display area. However, in a different embodiment, the display area could be a small section on the card material and the magnetic strip can be attached to the card material and not atop or under the display area.

Figure 3:
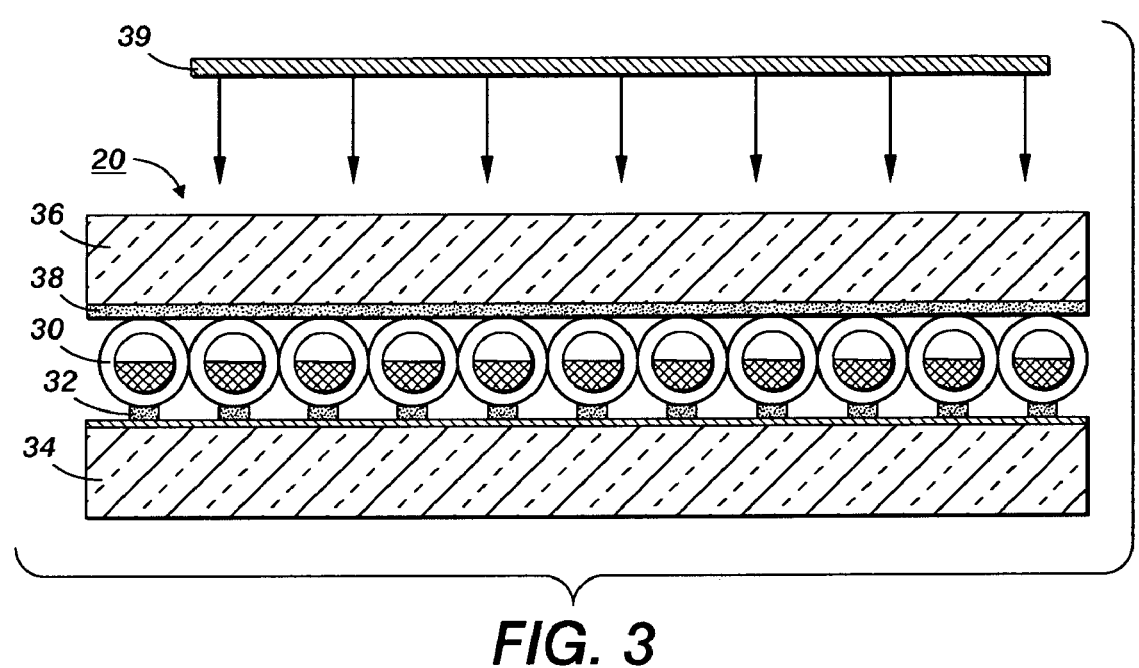
FIG. 3 illustrates exemplary interaction between a transaction card and a transaction card reader.

FIG. 3 illustrates exemplary elements of a display area 20 according to one embodiment. The display area 20 includes an image formation layer that includes encapsulated bichromal capsules or particles 30 positioned atop a substrate 34. Suitable material for the substrate 34 may include polymer-coated paper, plastic, other card stock or other sturdy material. The substrate must not reject or substantially interfere with passage of an electromagnetic (electric and/or magnetic) field from an external source, such as an electrode or circuit board in a card reader, to selected particles in the image formation layer. Between the particles 30 and the substrate 34 is an optional patterned adhesive layer 32. Suitable material for the patterned adhesive layer includes any suitable adhesive material, including but not limited to pressure-sensitive adhesives, heat-activated adhesives and light-activated adhesives such as thermoplastics, polyolefins, silicone and/or epoxy.

Alternatively, a series of cavities or spacers may be used to hold the capsules in a desired location instead of, or in addition to, the adhesive layer. The particles may be positioned atop the adhesive layer 32 or at least partially embedded within the adhesive layer 32 or in the cavities. The particles may be covered with an overlayer, such as a transparent or substantially transparent conductive material 38 that may act as a counterelectrode. The counterelectrode may be, for example, indium tin oxide (ITO) that is positioned on or under transparent layer 36. The transparent layer may be comprised of Mylan®, plastic, glass, or another suitable material. Together, the layers form a re-addressable display material in which the particles 30 rotate in response to an electric or magnetic field that is applied to the image formation layer through the substrate 34 from an external source. The counterelectrode 38 may be used to vary the field.

The capsules or particles 30 may be or may contain any bichromal or multichromal display materials such as bichromal beads, electrophoretic particles, twisting cylinders and the like. The size of the capsules is preferably substantially uniform, although uniformity is not required. When the material is bichromal, the capsules and/or beads within the capsules are one color (such as white) on one surface and a different color (such as black) on the other surface. Multichromal capsules may have different configurations. For signage applications, the diameter of the capsules may be approximately 120 microns (µm), within which bichromal beads having a diameter of approximately 100 µm may be contained. Other capsule and particle sizes are possible. For example, larger beads may provide easier and lower-cost manufacturing in some embodiments, while smaller beads may provide a card with a higher resolution display.

Returning to FIG. 2, information storage medium 22 embodiments may include, but are not limited to, a magnetic strip, a magnetic tape, or a chip. In one embodiment, the information storage medium may be a magnetic strip where data has been encoded multiple times on the strip. In an embodiment, the strip may be positioned, the card may include three tracks on the magnetic strip and each track can be about one-tenth of an inch wide, as set forth in International Organization for Standardization/International Electrotechnical Commission (ISO/IEC) standard 7811. However, other sizes are possible.

In one embodiment, the information storage medium may be a magnetic strip. The strip may include, but is not limited to, small iron-based magnetic particles covered in a plastic material. By magnetizing the tiny magnets in a specific direction, the magnetic strip can be encoded with a value. When the polarity of the bars align in the same direction, the card is blank. A value or other data can be given to the card by using flux reversal which reverses the polarity of the magnets causing a change in the magnetic field. The change in the magnetic field can be detected by a card reader. A magnetic field is created which can reverse the polarity of the magnetic bars in the magnetic strip. Data can be written to the card by reversing polarities in a specified sequence. A transaction card reader reads the information on the magnetic strip by detecting changes in the magnetic field caused by the flux reversals.

In an alternate embodiment, the information storage medium may include an electronic tag, such as a radio frequency identifier (RFID) tag, and the card reader may have the ability to read data from the tag.

In one embodiment, the card can be used in any transaction card reader, such as an automated teller machine (ATM), point-of-sale transaction terminal, or access card reader, where the reader also has capability to change the bichromal material display. The magnetic strip or other information storage medium may be positioned to be a specified distance from the edge of the card so that the magnetic strip on the card may be read and optionally changed, by the transaction card reader. For example, a card's dimensions may be approximately 86 millimeters (mm) long, approximately 55 mm wide, and approximately 0.8 mm thick, and meet other ISO standards or the standards of any other current or future standards-setting entity, including the placement of the magnetic strip, so that it can easily be read by a transaction card reader. Other sizes are possible. Alternately, as described below, other storage media may be used.

Figure 4:
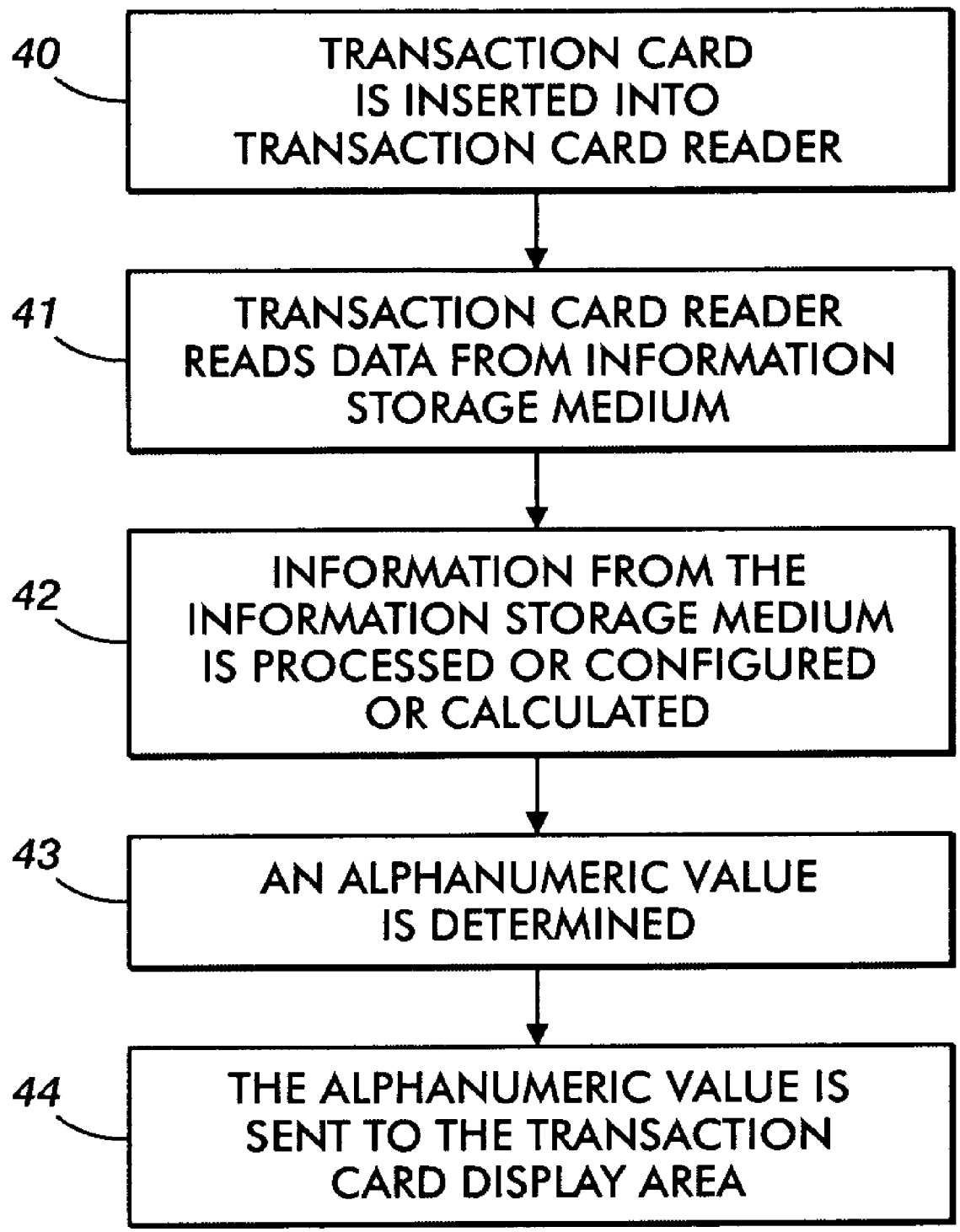
FIG. 4 illustrates a process of a transaction card reader receiving, calculating, configuring, or processing a transaction card to determine an alphanumeric value.

FIG. 4 is a flow diagram illustrating a process by which a transaction card reader may take a transaction card 40 and read information from the information storage medium on the card 41. The information storage medium may provide access to credit accounts, bank accounts or other information about or relating to the owner or user of the card. The transaction card reader, or a computing device in electronic communication with the card reader, processes the information 42 and determines an alphanumeric value 43 or identifies an image. The alphanumeric value is then sent to the transaction card display area 44.

In one embodiment, the transaction card reader processes the data from the transaction card either at the reader or through a computerized network system such a WAN, LAN, or other computer networked system. For example, the magnetic strip may contain a user's identification number. The transaction card reader uses the networked computers to retrieve the user's information from an external storage device such as a database. The information may be calculated or processed to form an alphanumeric value, such as an amount of money remaining in the user's account, or identify an image, such as a photo of the user. The alphanumeric value or image may be saved in the external storage device and sent to the transaction card reader for display of the card.

In a variation on the above embodiment, the processing of the alphanumeric value or image from the external storage device may be completed at the transaction card reader and then the alphanumeric value or image may be sent back to the external storage device for optional storage.

In another embodiment, the information storage medium may be a computer-readable chip and the information is stored on the card. A transaction card reader reads the information from the chip and processes the alphanumeric value. After the calculation is completed, the new alphanumeric value may be written to the chip on the card, thus replacing the old value written on the card.

In a third embodiment, the information on the card may be encoded as a Radio Frequency Identifier (RFID). A RFID reader reads the data from the card and processed. After the calculation, the new value may be written to the RFID replacing the old value.

After the transaction card reader either receives, calculates, configures or processes the alphanumeric value, the transaction card reader writes the information to a human readable display on the card by configuring bichromal material to display alphanumeric information. The alphanumeric information displayed may be, without limitation, a number, such as the amount left on the card, a new card number, a bar graph, or a word or phrase. The card reader may be any electronic device that can read data from the information storage medium and apply an electric or magnetic field to change the orientation of the bichromal material in the display.

Referring again to FIG. 3, the information on the display may be created by the transaction card reader by applying an electromagnetic force to the bichromal material 30. When the card is in the card reader, the bichromal display material may be positioned atop or next to a conductive layer that will selectively apply an electromagnetic field to the display area to selectively rotate the bichromal material and form an image. A bichromal ball can be selectively rotated within its fluid-filled cavity or other position. Thus, the application of a field to an area, such as a pixel, will present either the black or white hemisphere of the balls located over the pixel to an observer viewing the surface of the display area. Thus, by application of an electric field addressable in two dimensions (as by a matrix addressing scheme), the black and white sides of the balls can be caused to appear as the image elements (e.g., pixels or subpixels) in a displayed image. Note that the use of black and white hemispheres is only illustrative, and that other colors may be used.

The polarity of the electric field 39 applied by the transaction card reader in specific locations to the bichromal material may result in the bichromal material 30 being displayed as an alphanumeric value for the user. In one embodiment, the bichromal material 30 includes capsules having surfaces that are approximately half black and approximately half white. The capsules 30 change orientation when an electric or magnetic force is applied to spin the capsules into a different pattern over the substrate 34. A dark mark may be displayed in areas where the dark side of the capsule 30 faces away from substrate 34 and a white background may appear in areas where the white side of a capsule 30 faces away from the substrate 34. The alphanumeric value displayed in the display area may remain substantially stable until a new value is written to the display by the transaction card reader.

Thus, the transaction card reader has suitable features to write to the display area, and it need not use any circuitry or power source on the card. The display area on the card is of such a construction that the application of electrical energy (but which can also include magnetic, electromagnetic, or electrostatic energy) can be used to alter information which is visible on the display area. No circuitry internal to the card is needed to alter the display. Instead, the circuitry needed to alter the display may be contained entirely in the card reader or other device that processes information needed for the transaction. The electric field may be generated by one or more voltage sources in the transaction card reader, such as pixel drivers and a plate driver in the transaction card reader.

In the transaction card reader, there may be an area for selectively magnetizing (or electrostatically charging) the display area of a transaction card when it is inserted into the reader. Magnetic charges within the transaction card reader will cause one side of the bichromal material in the capsules to be displayed in the display area forming the desired alphanumeric value or image as each part of the display area moves through the transaction card reader.

In a preferred embodiment, when the transaction card is processed by the transaction card reader, it may effectively be given a new alphanumeric value. The display area may display the value on the transaction card, the name or the identification number on the transaction card, or other useful information. The alphanumeric data for determining what characters to place on the transaction card can be derived from a control system associated with a computer or audiovisual device.

In one embodiment, the transaction card may be a credit or debit card such as of the type commercially available from banks or lenders at the present or in the future. The front of the card may have the user's card number displayed in the display area by the bichromal material. In this embodiment, the identification number could be hidden until swiped through a card reader, thus reducing the likelihood of identify theft. Theft is substantially reduced in an embodiment where the transaction card reader receives a personal identification number, biometric input, or other identifier before accepting the card or changing the display of the card. In another embodiment, the card may be a transit pass where the bichromal material can be used to display the amount of money left on the card. In an alternate embodiment, the card can be an access card and the bichromal information can be used to display visitor information that allows a visitor temporary access into a building or a portion of a building, such as a hotel room.

It is to be understood that the invention is not limited in its application to the details of construction and to the arrangements of the components set forth in this description or illustrated in the drawings. The invention is capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

What is claimed is:

1. A transaction card comprising:
   an electronically-alterable display forming at least a portion of a transaction card, wherein the display is alterable through the application of an external field without requiring any circuitry on the card; and
   an information storage medium, wherein:
   the display comprises capsules that have a light and dark color;
   the capsules contain bichromal material;
   the bichromal material may change orientation in response to the external field;
   the orientation of the bichromal material determines an image or value on the display; and
   the display is integral to the transaction card.

2. The card of claim 1, wherein the capsules are positioned between a substrate and a transparent overlayer.

3. The card of claim 1, wherein the display is altered based on a transaction card reader reading the information storage medium and applying the external field to change the display area.

4. The card of claim 1, wherein the display area changes when the orientation of the bichromal material is altered by selective application of the external field.

5. The card of claim 1, wherein the information storage medium comprises a magnetic strip having a size and position on the card so that data on the strip can be read by a card reader.

6. The card of claim 1 wherein the information storage medium comprises a radio frequency identification tag.

7. The card of claim 1, wherein the information storage medium is positioned over at least a portion of the electronically-alterable display.

8. The card of claim 1, wherein a capsule is approximately 120 μm in diameter.

9. A method of changing a display member on a card comprising:
   receiving, by a card reader, a card;
   reading, by the card reader, information from an information storage medium on the card;
   processing the information to determine an item to be displayed; and
   writing the item to a human readable display on the card by configuring bichromal material to display the item wherein:
   the bichromal material is contained in capsules;
   the bichromal material may change orientation in response to an external field;
   the orientation of the bichromal material determines an image or value on the display; and
   the display is integral to the card.

10. The method of claim 9, further comprising writing the item to the information storage medium.

11. The method of claim 9, wherein the card reader communicates with an external device that performs at least a portion of the processing.

12. The method of claim 9, wherein the item is an alphanumeric value.

13. The method of claim 12, wherein the alphanumeric value is a new card number.

14. The method of claim 9, wherein the item is an image.

15. The method of claim 9, wherein the item is a monetary value.

16. The method of claim 9, wherein the information storage medium contains data that identities a user or a user's account.

17. The method of claim 9, wherein the bichromal material is responsive to a field applied by the card reader without the use of circuitry or a power source on the card.

18. A transaction card, comprising:
    an information storage medium; and
    a readdressable display comprising bichromal material that is responsive to a selectively applied field to produce an image on the display;
    wherein:
    the bichromal material is contained in capsules;
    the bichromal material may change orientation in response to the applied field;
    the orientation of the bichromal material determines an image or value on the display;
    no circuitry or power source is required on the card to create or maintain the display; and
    the display is integral to the transaction card.

19. The transaction card of claim 18, wherein the display further comprises a substrate and a conductive overlayer, and the bichromal material is positioned between the substrate and the conductive overlayer.

20. The transaction card of claim 18, wherein the information storage medium has a size and position such that data on the strip may be read by a card reader.

21. The transaction card of claim 18, wherein the information storage medium is positioned over at least a portion of the readdressable display.

22. The transaction card of claim 18, wherein a capsule is approximately 120 μm in diameter.

* * * * *